US012768014B2

(12) United States Patent
Desiles et al.

(10) Patent No.: US 12,768,014 B2
(45) Date of Patent: Oct. 20, 2026

(54) HIERARCHICAL COMPOSITE WEAR PART WITH STRUCTURAL REINFORCEMENT

(71) Applicant: MAGOTTEAUX INTERNATIONAL S.A., Vaux-sous-Chèvremont (BE)

(72) Inventors: Stéphane Desiles, Aywaille (BE); Guy Berton, Oteppe (BE); Marc Babineau, Beaufays (BE); Amoldeep Singh Jaggi, Kent, WA (US)

(73) Assignee: MAGOTTEAUX INTERNATIONAL S.A., Vaux-sous-Chèvremont (BE)

( * ) Notice: Subject to any disclaimer, the term of this patent is extended or adjusted under 35 U.S.C. 154(b) by 35 days.

(21) Appl. No.: 18/935,339

(22) Filed: Nov. 1, 2024

(65) Prior Publication Data

US 2025/0059633 A1 Feb. 20, 2025

Related U.S. Application Data

(62) Division of application No. 18/255,521, filed as application No. PCT/EP2021/082918 on Nov. 25, 2021, now Pat. No. 12,365,969.

(30) Foreign Application Priority Data

Dec. 10, 2020 (EP) .................................... 20213121

(51) Int. Cl.
*C22C 29/00* (2006.01)
*B02C 13/28* (2006.01)
(Continued)

(52) U.S. Cl.
CPC ............ *C22C 29/005* (2013.01); *B02C 13/28* (2013.01); *B22D 19/02* (2013.01); *B22F 10/14* (2021.01); *B22F 10/64* (2021.01); *B33Y 10/00* (2014.12); *B33Y 40/20* (2020.01); *B33Y 80/00* (2014.12); *C22C 1/1068* (2013.01); *C22C 32/0052* (2013.01); *C22C 32/0089* (2013.01); *B02C 2210/02* (2013.01); *B22F 2005/001* (2013.01); *B22F 2201/11* (2013.01); *B22F 2301/205* (2013.01); *B22F 2302/10* (2013.01); *B22F 2998/10* (2013.01); *B22F 2999/00* (2013.01); *B28B 1/001* (2013.01); *E02F 9/285* (2013.01); *Y10T 428/12042* (2015.01)

(58) Field of Classification Search
None
See application file for complete search history.

(56) References Cited

U.S. PATENT DOCUMENTS

| | | | | |
|---|---|---|---|---|
| 2013/0216813 A1* | 8/2013 | Ucok | B22D 19/02 | |
| | | | 428/221 | |
| 2018/0185916 A1* | 7/2018 | Francis | B33Y 80/00 | |

FOREIGN PATENT DOCUMENTS

| | | | | |
|---|---|---|---|---|
| CN | 110744031 A * | 2/2020 | B33Y 10/00 | |

* cited by examiner

*Primary Examiner* — Seth Dumbris
(74) *Attorney, Agent, or Firm* — Kolitch Romano Dascenzo Gates LLP

(57) ABSTRACT

The present disclosure is related to methods of manufacturing a hierarchical composite wear component comprising a reinforced part, said reinforced part comprising a reinforcement of a triply periodic minimal surface ceramic lattice structure, said structure comprising multiple cell units, said cell units comprising voids and micro-porous ceramic cell walls, the micro-pores of the cell walls comprising a sinter metal or a cast metal, the ceramic lattice structure being embedded in a bi-continuous structure with a cast metal matrix.

6 Claims, 11 Drawing Sheets

(51) Int. Cl.

| | |
|---|---|
| ***B22D 19/02*** | (2006.01) |
| ***B22F 10/14*** | (2021.01) |
| ***B22F 10/64*** | (2021.01) |
| ***B33Y 10/00*** | (2015.01) |
| ***B33Y 40/20*** | (2020.01) |
| ***B33Y 80/00*** | (2015.01) |
| ***C22C 1/10*** | (2023.01) |
| ***C22C 32/00*** | (2006.01) |
| *B22F 5/00* | (2006.01) |
| *B28B 1/00* | (2006.01) |
| *E02F 9/28* | (2006.01) |

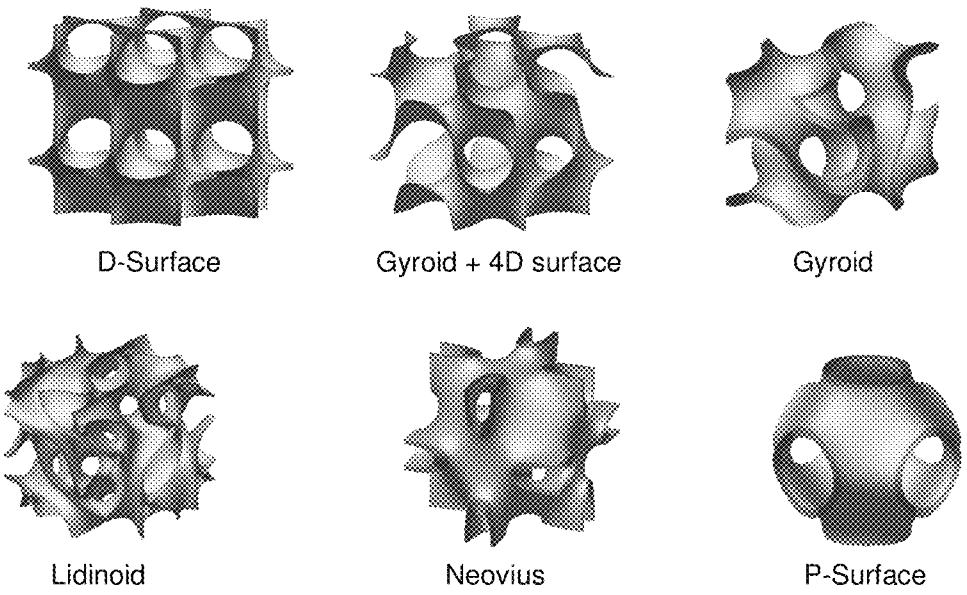
Fig.1 PRIOR ART
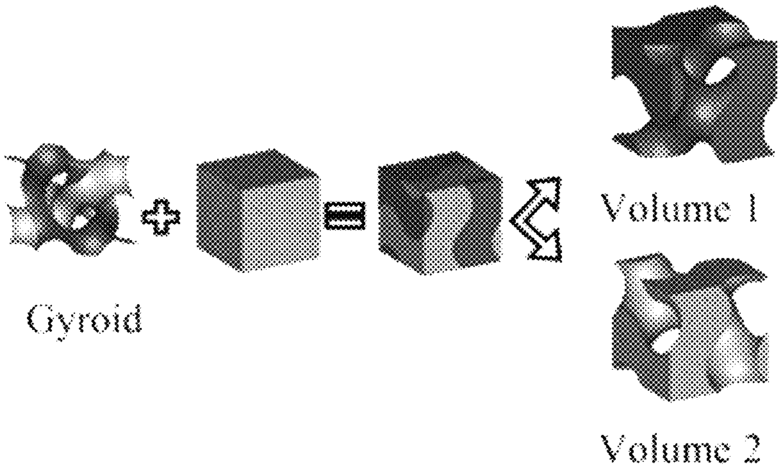
Fig.2

A B

A B

A B

HIERARCHICAL COMPOSITE WEAR PART WITH STRUCTURAL REINFORCEMENT

FIELD

The present disclosure relates to wear components used in the grinding and crushing industry such as cement factories, quarries and mines.

INTRODUCTION

These components are subject to high mechanical stresses in the bulk and to high wear by abrasion at the working faces. It is therefore desirable that these components should exhibit high abrasion resistance and some ductility to be able to withstand the mechanical stresses such as impacts.

Given that these two properties are difficult to match with the same material composition, composite wear components have been proposed in the past with a matrix made of relatively ductile alloy in which ceramic inserts of good wear resistance are embedded.

Document U.S. Pat. No. 8,999,518 B2 discloses a hierarchical composite material comprising a ferrous alloy reinforced with titanium carbide in the form of a grain aggregate infiltrated during the casting of the ferroalloy. The reinforcement structure is positioned on the face the most exposed to wear.

Document WO 2010/031663A1 relates to a composite impactor for percussion crushers, said impactor comprising a ferroalloy which is at least partially reinforced with titanium carbide according to a defined geometry on the most stressed face of the wear part.

Document WO 2019/211268A1 relates to a composite tooth for working the ground or rocks, said tooth having a ferrous alloy reinforced at least in part by an insert, said part reinforced by the insert making it possible, after in situ reaction, to obtain an alternating macro/microstructure of concentrated millimetric zones of micrometric globular particles of titanium carbides separated by millimetric zones substantially free of micrometric globular particles of titanium carbides, said concentrated zones of micrometric globular particles of titanium carbides forming a microstructure in which micrometric interstices between said globular particles are also occupied by said ferrous alloy, characterized in that said macro/microstructure generated by the insert is spaced by at least 2 mm, preferably at least 3 mm, from the distal surface of said tooth.

Various experiments have shown that the composition or the positioning of ceramics or elements in the reinforced wear parts are not the only important features to be focused on, but the geometry of the reinforcement itself, or rather the appropriate choice of the reinforcement geometry adapted to the specific wear part, is also of high importance.

In this context, various three-dimensional reinforcement lattice structures, based on triply periodic minimal surface (TPMS) embedded in a ferroalloy matrix of specific wear parts have been tested.

According to Schnering et Nesper [Schnering 1991], the surface of some typical triply periodic minimal surface structures (TPMS) can be approximated by simplified equations, said structures being named on the following list:

$$D\text{-surface: } \cos(X)\cdot\cos(Y)\cdot\cos(Z)-\sin(X)\cdot\sin(y)\cdot\sin(Z)=C$$

$$\text{Gyroid: } \sin(X)\cdot\cos(Y)+\sin(Y)\cdot\cos(Z)+\cos(X)\cdot\sin(Z)=C$$

-continued $$I\text{-}WP\text{: } 2\cdot(\cos(X)\cdot\cos(Y)+\cos(X)\cdot\cos(Z)+\cos(Y)\cdot\cos(Z))-\cos(2X)+\cos(2Y)+\cos(2Z)=C$$

$$\text{Lidinoid: } \sin(2X)\cdot\cos(Y)\cdot\sin(Z)+\sin(2Y)\cdot\cos(Z)\cdot\sin(X)+\sin(2Z)\cdot\cos(X)\cdot\sin(Y)-\cos(2X)\cdot\cos(2Y)-\cos(2Y)\cdot\cos(2Z)-\cos(2Z)\cdot\cos(2X)=C$$

$$\text{Neovius: } 3\cdot(\cos(X)+\cos(Y)+\cos(Z))+4\cdot\cos(X)\cdot\cos(Y)\cdot\cos(Z)=C$$

$$P\text{-surface: } \cos(X)+\cos(Y)+\cos(Z)=C$$

C being a constant (generally=0) in case of surfaces without thickness.

For the purpose of the present disclosure, we consider not only the TMPS as commonly described in the literature, but also linear combinations thereof.

The above equations represent (iso) surfaces without thickness. The following publications are indicative for methods used to generate skeletons (with wall thickness), based on triply periodic minimal surface (TPMS):

- "*Design and Characterization of Sheet-Based Gyroid Porous Structures with Bioinspired Functional Gradients*" by Yuan Jin, Haoyu Kong, Xueyong Zhou, Guangyong Li and Jianke Du. Published in Materials 2020, 13, 3844; doi: 10.3390/ma13173844.
- "*3D printed compact heat exchangers with mathematically defined core structures*" by Jiho Kim and Dong-Jin Yoo. Published in Journal of Computational Design and Engineering, 2020, 7 (4), 527-550; doi: 10.1093/jcde/qwaa032.
- "*Technical Note: Gyroid structures for 3D-printed heterogeneous Radiotherapy phantoms*" by R. Tino, M. Leary, A. Yeo, M. Brandt and T. Kron. Published in Physics in Medicine & Biology, 2019, Volume 64, Number 21; DOI: 10.1088/1361-6560/ab48ab.

Specific examples of such skeleton structures are exemplified in FIG. 1.

US2020/171753A1 discloses a gyroidal lattice structures additively manufactured. For the purpose of definition of "triple periodic minimal surface structures" and in particular gyroidal structures, document US2020/171753A1 is incorporated as reference to the present disclosure.

CN109516789 discloses a porous $Al_2O_3$ structure based on a gyroid curved surface. The ceramic and its preparation method are based on a triple periodic minimal curved surface (TPMS) which is continuous, and three-dimensionally connected. The prepared porous $Al_2O_3$ ceramic gyroidal structure has a high hardness, high temperature resistance, and corrosion resistance.

In the present disclosure, the expression "triply periodic minimal surface" should not be interpreted stricto sensu as a mathematical concept rigorously related to surfaces but as a lattice structure (skeleton) of connectible unit cells in which each unit cell comprises cell walls and voids, the cell walls occupying a certain volume of the unit cell, the voids occupying the balance of the volume, and the lattice structure exhibiting a periodicity along all three dimensions. For this reason, we use the expression "three-dimensional lattice structure of, or based on, a triply periodic minimal surface (TPMS)", or simply: "TPMS lattice structure". The cell walls exhibit a variable micro-porosity according to the manufacturing method of the TPMS and its composition.

In a TPMS skeleton structure, the surface has a substantially continuous curvature at any points of the structure, not only within a unit cell, but also at the junctions between two unit cells. FIG. 20 shows an example of an assembly of three P-Surface unit cells.

This characteristic is important for the mechanical resistance of this reinforcement structure, since surface curvature discontinuities are the location of high stress and are therefore weak zones.

TPMS lattice structures are not assemblies of different volumes, where volume surfaces do not meet tangentially. In such scaffolds assemblies, the curvatures at the junctions of the different volumes are discontinuous. FIG. 21 shows an example of an assembly of a sphere and a horizontal cylinder. At the junction 1 between the two volumes, the curvature of the sphere 2 is not equal to the curvature of the cylinder 3.

TPMS lattice structures are not foam structures, made of cells with a random size and shape and extending in all directions.

Document CN108396165A discloses a periodic structure made of an assembly of spherical, cylindrical or cube-shaped elements. However, these elements do not join with continuous curvatures. At the junctions, the curvature of the two elements is not continuous. The periodic structure disclosed is therefore not a TPMS lattice (skeleton) structure as disclosed in the present document (see FIG. 21).

Document CN110615672A discloses a hemisphere or sphere with a foam structure. It is therefore not periodic, unlike the TPMS lattice (skeleton) structures disclosed in the present disclosure.

Document US2018185916A1 discloses an open cell foam structure which is not periodic, unlike the TPMS lattice (skeleton) structures disclosed in the present disclosure.

SUMMARY

The present disclosure relates to a hierarchical composite wear component obtained by casting technology, the wear component having an improved resistance to the combined abrasion and impact stresses and good resistance to breakage. Wear components of the present disclosure comprise a three-dimensional reinforcement network based on a triply periodic minimal surface (TPMS) lattice structure, in particular a TPMS-based lattice structure additively manufactured by 3D printing devices. The present disclosure aims to provide a hierarchical composite wear component obtained by casting technology comprising a three-dimensional reinforcement network based on a triple periodic minimal surface (TPMS) lattice structure preferably additively manufactured by 3D printing of ceramics or ceramic-metal powders selected from the group consisting of carbides, borides and nitrides, in particular titanium carbides, tungsten carbides and titanium carbo-nitrides.

The present disclosure discloses a hierarchical composite wear component comprising a reinforced part, said reinforced part comprising a reinforcement of a triply periodic minimal surface ceramic lattice structure, said structure comprising multiple cell units, said cell units comprising voids and micro-porous ceramic cell walls, the micro-pores of the cell walls comprising a sinter metal or a cast metal, the ceramic lattice structure being embedded in a bi-continuous structure with a cast metal matrix.

Preferred embodiments of the present disclosure disclose at least one, or an appropriate combination of the following features:

- the triply periodic minimal surface lattice structure is selected from the group consisting of gyroid, lidinoid, neovius, P-surface, diamond (D-surface) and I-WP or their combinations and derivatives;
- the size of the cell units are comprised between 10 and 60 mm, preferably 15 and 50 mm, the thickness of the cell walls being comprised between 1 and 15 mm, preferably 2 and 10 mm;
- the concentration of the ceramic material within the reinforced part is managed by the variation of the cell wall thickness and/or the size of the cell unit over the section of the reinforced part;
- the ceramic material is selected from the group consisting of metallic carbides, borides and nitrides or combinations thereof;
- the ceramic material is selected from the group consisting of titanium carbides, titanium carbo-nitrites; titanium chrome carbides, titanium borides, and tungsten carbides;
- the cast metal matrix is a ferroalloy matrix comprising steel or cast iron;
- the sinter metal present in the micro-pores of the cell walls is selected from the group consisting of titanium, tungsten, chrome, steel and cast iron or combinations thereof;
- the concentration of the ceramic material in the lattice structure ranges from 30 to 90 vol %, preferably from 40 to 80 vol %;
- the concentration of the ceramic material in the reinforced part ranges from 5 to 50 vol %, preferably 10 to 40 vol %;

The present disclosure further discloses a method for the manufacturing of the hierarchical composite wear component of the present disclosure comprising the steps of:

- manufacturing of the ceramic lattice structure of a triple periodic minimal surface geometry via a powder mix comprising ceramic particles;
- at least partially sintering the ceramic lattice structure;
- positioning of the ceramic lattice structure in a mold;
- casting a ferroalloy to obtain the reinforced hierarchical composite wear component of claim 1.

Preferred embodiments of the method of the present disclosure disclose at least one, or an appropriate combination of the following features:

- the step of at least partially sintering the reinforcement ceramic lattice structure comprises an almost complete impregnation of the micro-porosity of the cell walls of said structure by a metal selected from the group consisting of titanium, tungsten, chrome, steel and cast iron or combinations thereof before the positioning in the mold and the final casting;
- the step of at least partially sintering is followed by a hot isostatic pressing step or post infiltration;
- the step of manufacturing of the reinforcement ceramic lattice structure based on a triple periodic minimal surface geometry is an additive manufacturing by binder jet technology followed by a binder curing at a temperature above 150° C.;
- the particles of the ceramic powder have a particle size $D_{50}$ comprised between 1 and 150 μm, preferably between 5 and 100 μm measured by laser diffraction technology.

The present disclosure further discloses the use of the hierarchical composite wear component as impact crusher, groove teeth.

BRIEF DESCRIPTION OF THE DRAWINGS

FIG. 1 represents an illustrative and not limitative selection of TPMS lattice structures and possible derivatives obtained by CAD modelling.

FIG. 2 is a conceptual representation of a gyroid unit cell of a gyroid-based ceramic-metal lattice structure (volume 1) embedded in a metal matrix (volume 2) leading to a composite structure associating two complementary volumes 1+2.

DETAILED DESCRIPTION OF THE PRESENT DISCLOSURE

Figure 3:
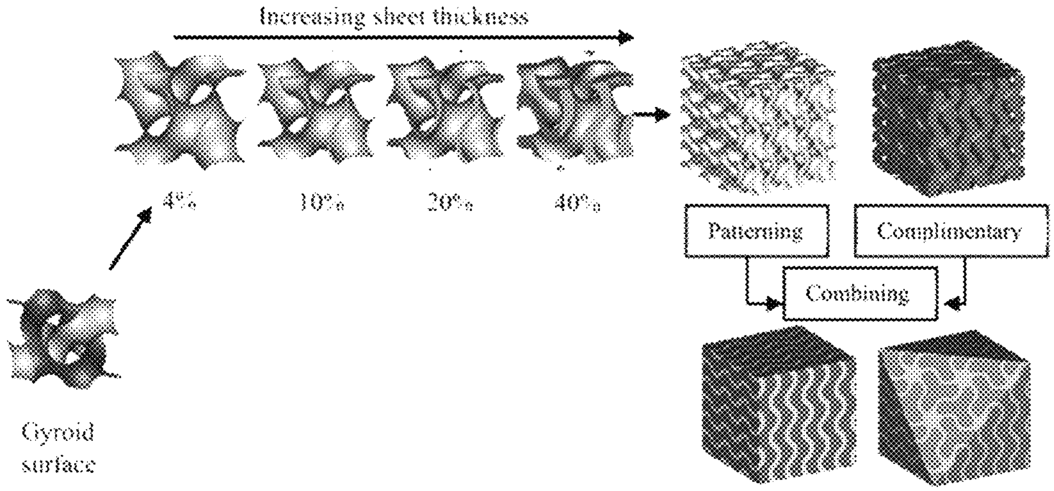
FIG. 3 is a conceptual representation of a gyroid unit cell with a gyroid-based ceramic lattice structure to be embedded in a metal matrix showing sheet thickness (cell-wall thickness) increasing the apparent volume of the reinforcement structure from 4 to 40 vol %. The combination of the patterned 3D gyroid-based lattice structure with the complementary volume of the metal matrix is represented as an entire cube and as a diagonal cut of the cube.
Figure 4:
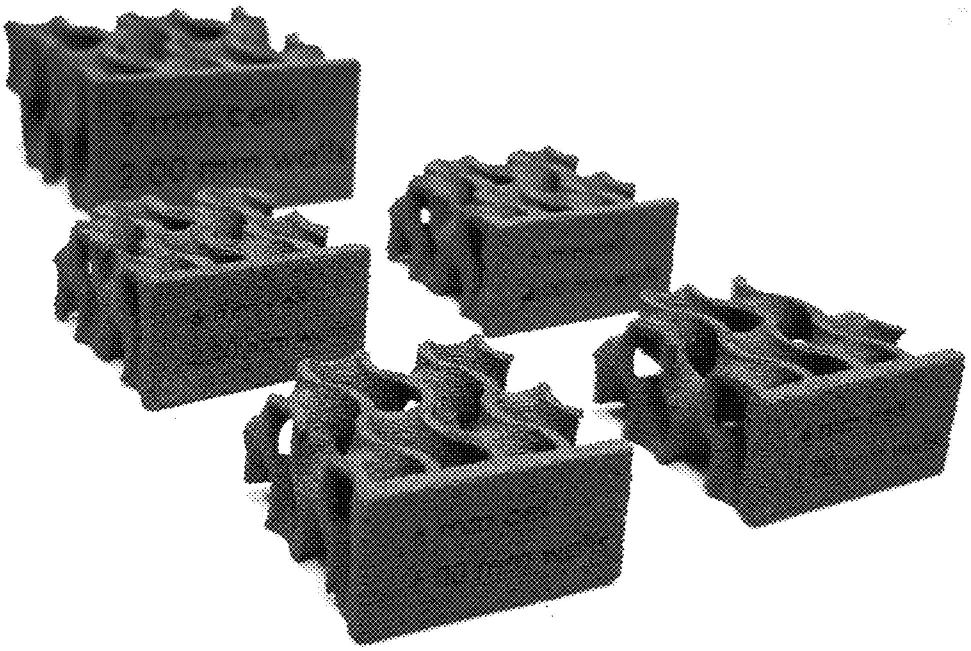
FIG. 4 represents gyroid-based structures of various sizes of a porous titanium carbide structure, with a base plate used as infiltrable insert for the reinforcement of wear parts of the present disclosure.

Triply periodic minimal surfaces structures (TPMS) separating spaces into two oppositely congruent labyrinths of passages can be described according to approximated mathematical formulas as mentioned above. Once embedded in a metal matrix of a cast hierarchical composite wear part, the ceramic or ceramic-metal composite and the cast metal form a co-continuous structure.

TPMS-based lattice structures, if manufactured in a 3D skeleton lattice structure, exhibit high compression strength and high resistance to flexion, which is used in the present disclosure to reinforce wear parts subjected to high mechanical stresses in the bulk and to high wear by abrasion at the working faces as mentioned above.

The choice of the TPMS-based structure (gyroid, lidinoid P-surface, etc. and their combinations) is guided by investigations on mechanical properties of additively manufactured polymer structures in the relevant literature showing, for example, that the fabricated structures have advantages over conventional honeycomb elements when used as a shock absorbing layer that will accept the shock load.

The following publications are indicative for the choice of the TPMS type:

"*Investigation of functionally graded TPMS structures fabricated by additive manufacturing*" by Shixiang Yu, et al. Shenzhen Key Laboratory for Additive Manufacturing of High-Performance Materials, Department of Mechanical and Energy Engineering, Southern University of Science and Technology, Shenzhen published in Materials and Design 182 (2019) 108021;

"*Compression-compression fatigue behaviour of gyroid-type triply periodic minimal surface porous structures fabricated by selective laser melting*" by Lei Yang and all published in Acta Materialia 181 (2019) 49-66.

It is difficult to transpose the results obtained in the above publications to a wear part manufactured by casting in the context of a ceramic-metal TPMS lattice structure, but it appears that a diamond-based TPMS structure should theoretically be more impact resistant than a gyroid-based lattice structure. Both structures were therefore compared in an anvil to verify this hypothesis.

In the present disclosure, TPMS-based structures are additively manufactured by 3D printing of any kind using powders of ceramics or ceramic-metal comprising carbides, carbo-nitrides and borides, preferably titanium carbides, tungsten carbides or titanium carbo-nitrides.

Description of the Additive Manufacturing Steps and the Wear Part Casting

To manufacture the TPMS insert of the present disclosure, it is necessary to create a digital 3D model structure and build it with powder in a 3D printing (additive manufacturing) device, the technology used in the present case is preferably binder jetting but is not limited thereto.

A general overview about 3D printing techniques and the various ASTM standards associated to characterisation and methods has been published on ScienceDirect: http://www-.sciencedirect.com/topics/engineering/binder-jetting.

This overview summarizes in 22 pages the content of 10 papers related to 3D printing techniques representative for the knowledge of those skilled in the art about this technology. For this purpose, this publication is herein incorporated as a reference.

Binder jetting technology is notably disclosed in document U.S. Pat. No. 6,036,777 (2000) and in US2015/0069649 A1.

A recent paper gives a complete overview about the relevant parameters of the binder jetting technology of ceramics:

"*Binder jetting of ceramics: Powders, binders, printing parameters, equipment, and post-treatment*" (2019) Xinyuan Lv, Fang Ye, Laifei Cheng*, Shangwu Fan, Yongsheng Liu Science and Technology on Thermostructural Composite Materials Laboratory, Northwestern Polytechnical University, Xi'an, 710072, PR China.

This paper investigates steps and applications of binder jetting printing ceramics and discusses the key factors such as powders, binders, printing parameters, equipment, and post-treatment process as well as the influence of particle shape and size distribution of the ceramic powders. The influence of additives such as droplet-formation mechanism and droplet-infiltration kinetics of binders is also described. Furthermore, this document discusses printing parameters such as layer thickness, saturation, printing orientation, equipment, and post-treatment. For the purpose of explanation of the binder jetting technology, this paper is incorporated in the present application as a reference.

One important element of the binder jetting technology is the choice of the appropriate type of binder in view of its compatibility with the relevant ceramic or ceramic-metal powder. Various prior art documents have investigated different types of binders and ceramic powders.

WO2020/146452 A1 discloses a specific amine-containing adhesive polymer and a method for binder jetting additive manufacturing of an object. The method comprises separately feeding a powder from which said object is to be manufactured and a solution comprising an adhesive polymer dissolved in a solvent into an additive manufacturing device, wherein said adhesive polymer is an amine-containing polymer having a molecular weight of at least 200 g/mole dispensing selectively positioned droplets of said adhesive polymer, from a print head of said additive manufacturing device, into a bed of a powder to bind the particles and to produce a preform of the object to be manufactured.

US2019/0111618 A1 discloses a method for indirect additive manufacturing of an object by separately feeding a powder from which said object is to be manufactured and either a difunctional curable monomer or an adhesive polymer binder into an additive manufacturing device and dispensing selectively positioned droplets of said difunctional curable monomer or adhesive polymer binder, from a print head of said additive manufacturing device, into a bed of said powder to bind particles of said powder with said difunctional curable monomer or adhesive polymer binder to produce a curable preform having a shape of the object to be manufactured; and, in the case of the difunctional curable monomer, curing said curable preform to form a crosslinked object. This documents lists a series of available curable monomers with their curing temperature. This document is herein incorporated by reference.

Methodology for the Manufacturing of the Wear Part of the Present Disclosure

A preferred way to manufacture a wear part reinforced by a ceramic or a ceramic-metal TPMS skeleton insert, also called ceramic or ceramic-metal TPMS lattice structure, is to create a digital 3D model structure of multiple unit cells, build it in a 3D printing device, partially or completely sinter said additively manufactured structure, place the insert in a sand mold and pour hot liquid matrix metal (high chromium cast iron or steel) in order to infiltrate the voids and, if present, the micro-porosities of the insert and obtain a fully dense wear part.

The TPMS lattice manufacturing steps are as follows:

Digital 3D Model Structure

- A numerical 3D model of the ceramic TPMS insert is generated with the help of a computer-aided design (CAD) software (for example nTopology) https://ntopology.com/generative-design-software/and converted in a format that can be handled by a 3D printing device, for example STL (Stereolytography) format. Engineering performance requirements (such as wear or mechanical properties) often vary throughout the volume of the design and it is necessary to variably control key parameters, such as the lattice thickness or size (cell wall thickness or cell size).

In nTopology, Field-Driven Design can be used to spatially vary parameters of the lattice structures, such as wall thickness or cell size for example.

- The file is then processed by a slicing software that slices the model into 2D layers of predetermined thicknesses that can be printed.

Additive Manufacturing (AM) Process

- In this process, the ceramic powder is fed through a hopper, to build one single layer at a time of about 100 μm thickness for example. The ceramic powder comprises carbides (for example TiC), borides, or nitrides and possibly some other metallic elements. The particle size ($D_{50}$) is usually comprised between 1 and 150 μm, preferably between 2 and 50 μm, most preferably between 4 and 16 μm. (as measured by a laser diffraction particle size analyser such as Malvern Mastersizer 2000 according to Mie theory).
- A sieving step may be required if the powder granulometry does not meet the particle size distribution target (conditioned by flowability and printing resolution).
- The ceramic powder is introduced in the hopper of the 3D printing device to build the insert layer by layer (vibrations and recoating roller may be used to increase the packing density of the layer, mainly in case of fine or poorly flowable powders).
- Depending on the additive manufacturing technique, a moving head generates powder cohesion in specific areas on the layer, by binder jetting or by agglomerating the powder particles with a melting process for example (fused bed by LASER technology). The agglomeration also occurs with the previous layers, underneath the current layer. In case of binder jetting, a liquid binder is deposited, by a moving head, as droplets in specific areas of the layer according to the 2D file. An important parameter is to define a suitable saturation level in order to get the suitable bonding between the particles of the layer and also between the previous printed layer. The preferred binder is for example a water dispersable glycol-acrylic-based binder such as tetraethylene glycol dimethacrylate; tetraethylene glycol diacrylate; triethylene glycol dimethacrylate, diethylene glycol 2, metoxy ethanol or preferably mixings suitable for forming interconnected molecular networks which can be dispersed in water and cured at 200° C. for about 2 hours per cm of material to be cured.

The next layer is then deposited and the above steps are repeated until the whole insert has been built in the powder bed.

Curing and Sintering

If a crosslinkable monomer binder has been chosen, it needs to be cured. The complete box is heated at a temperature of about 200° C. in a curing oven to give strength (via polymerization, cross-linking, solvent evaporation or some other mechanisms) to the part during a period of time depending on the box volume to ensure homogeneity of temperature (for about 2 hours/cm for example).

The box is then left to cool completely and the green part can be handled safely without the risk of breakage.

The excess powder is removed from the box by brushing, vacuuming or blowing compressed air for example.

The green TPMS lattice structure is then placed in a furnace and heated at high temperature (usually above 1000° C.), under controlled atmosphere (usually argon or vacuum) to perform the sintering step. The sintering may be total or partial, depending on the desired final insert wall porosity. In case of partial sintering, the lattice structure can also be further infiltrated by capillarity by a metal during the same or a further heat treatment.

Wear Part Manufacturing

The finished ceramic or ceramic-metal TPMS lattice structure is placed in a sand mold at the position where the wear resistance/and breakage resistance of the wear part are sought.

Liquid metal is poured into the mold. The liquid metal infiltrates the TMPS lattice structure to create a co-continuous reinforced structure with the ceramic TPMS structure being embedded in the cast metal matrix.

In case of partially sintered TPMS inserts with a remaining micro-porosity, the liquid metal infiltrates the cell walls of the TPMS lattice structure, leading to a very intimate ceramic/metal bound.

The liquid metal is left to cool until complete solidification of the cast part. The sand mold is then removed and the final part is cleaned from remaining sand, and can follow the regular finishing foundry process steps known by those skilled in the art (knock-out, shot-blasting, grinding, additional heat treatments (annealing, quenching, tempering, . . . )).

A last machining step may be required to reach the final dimensional target.

EXAMPLES—ANVIL AND TEETH WEAR PARTS

Anvil

Example 1

A mixture of 93 wt % of titanium carbide powder, with an average particle size $D_{50}$ of 11 μm, was mixed for 15 minutes with 7 wt % of titanium powder, with an average particle size $D_{50}$ of 40 μm, in a blender inerted with argon.

Figure 14:
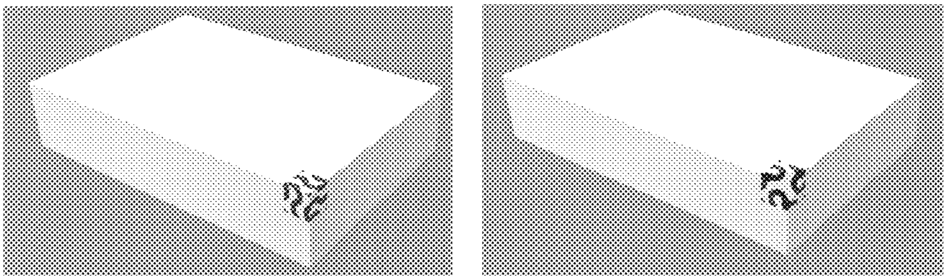
FIG. 14 represents a gyroid unit cell of 11 mm length with 3 mm wall thickness in a 150×100×30 mm insert (A) and a diagonal cut representation (B).

The homogenous mixture was then used to print a gyroid lattice structure of 150×100×30 mm with a cell unit size of about 11 mm and a cell wall thickness of about 3 mm (as represented in FIG. 14) on an X1 25 Pro 3D Binder jet printer from the company EXone. An aqueous binder based on a mix of diethylene glycol as dispersion in a water solution of 2-butoxyethanol was used to print the part (BA005 EXone).

The key parameters of the AM process were the following:

each printed layer was about 100 μm thick;

the printing speed was 90 seconds per layer;

the binder saturation of the powder pores was 90%; and the powder packing density was about 49%.

After completion, the entire printing box was cured in an oven at about 200° C. for 2 hours per cm of part height, the residence time depending on the number of lattice structures since multiple items can be manufactured in one run.

After cooling, the printing box was de-powdered by vacuuming and brushed to obtain the green gyroid lattice structure.

The obtained green gyroid lattice structure was placed in a furnace and heated to about 1150° C. for 2 hours under argon atmosphere.

The gyroid lattice structure comprises a total of about 74 vol % empty space available for a ferroalloy infiltration (about 47 vol % due to voids in the gyroidal lattice structure (cell unit) and an additional 27 vol % micrometric pores inside the cell walls), the remaining 26 vol % in the cell walls being titanium carbides+metallic titanium.

Figure 12:
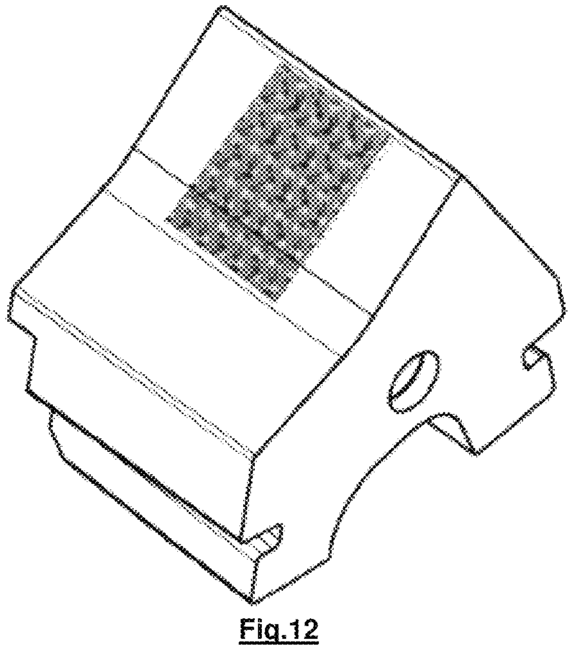
FIG. 12 represents the outline of a reinforced anvil with a gyroid-based ceramic-metal insert structure according to the present disclosure positioned in the most stressed zone of the wear component.

The obtained gyroid lattice structure is then positioned in a sand mold in the area of the wear part to be reinforced (hierarchical wear part as represented in FIG. 12).

Hot liquid high-chromium white iron at about 1640° C. is then poured into the mold, filling the 47 vol % of the gyroidal lattice voids and infiltrating the 27 vol % of micrometric porosity between the particles of the cell walls.

After pouring, 53 vol % of the reinforced volume contains a high concentration of about 49 vol % of titanium carbide (powder packing density). The global volume content of titanium carbides in the reinforced portion of the wear part is thus of about 26 vol %.

Example 2

Example 2 is performed in the same way as in example 1, but with a different cell unit size and cell wall thickness.

Figure 15:
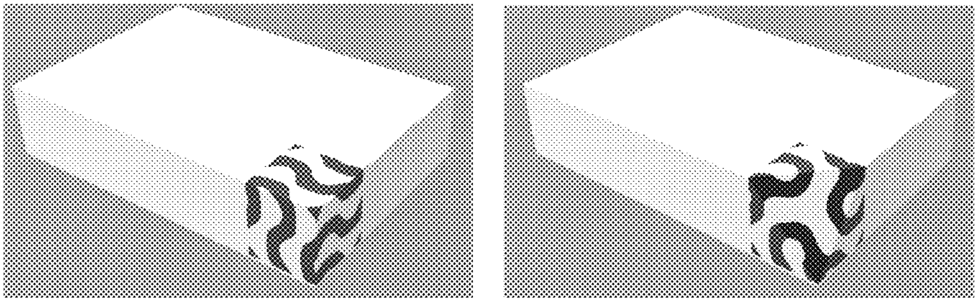
FIG. 15 represents a gyroid unit cell of 29 mm length and 8 mm wall thickness in a 150×100×30 mm insert (A) and a diagonal cut representation (B).

The homogenous powder mixture was used to print a gyroid lattice structure of 150×100×30 mm with a cell unit size of about 29 mm and a cell wall thickness of about 8 mm (as represented in FIG. 15) with the same equipment used for example 1. An aqueous binder based on a mix of diethylene glycol as dispersion in a water solution of 2-butoxyethanol was used to print the part (BA005 EXone).

The key parameters of the AM process and the curing were the same as in example 1 (curing at 200° C. for 2 hours and then furnace heated at 1150° C.)

This gyroid lattice structure was again obtained by a powder packing density of 49% and comprises a total of about 74 vol % empty space available for a ferroalloy infiltration (about 46 vol % due to voids in the gyroidal lattice structure (cell unit) and an additional 28 vol % micrometric pores inside the cell walls), the remaining 26 vol % in the cell walls being titanium carbide+metallic titanium.

The obtained gyroidal lattice structure is then positioned in a sand mold in the area of the wear part to be reinforced (hierarchical wear part as represented in FIG. 12).

Hot liquid high-chromium white iron at about 1640° C. is then poured into the mold, filling the 46 vol % of the gyroidal lattice voids and infiltrating the 28 vol % of micrometric porosity between the particles of the cell walls.

After pouring, 54 vol % of the reinforced volume contains a high concentration of about 49 vol % of titanium carbide (powder packing density). The global volume content of titanium carbide in the reinforced portion of the wear part is thus of about 26 vol %.

Example 3

A mixture of 93 wt % of titanium carbide powder with an average particle size $D_{50}$ of 11 μm, was mixed for 15 minutes with 7 wt % of titanium powder, with an average particle size $D_{50}$ of 40 μm in a blender inerted with argon.

Figure 16:
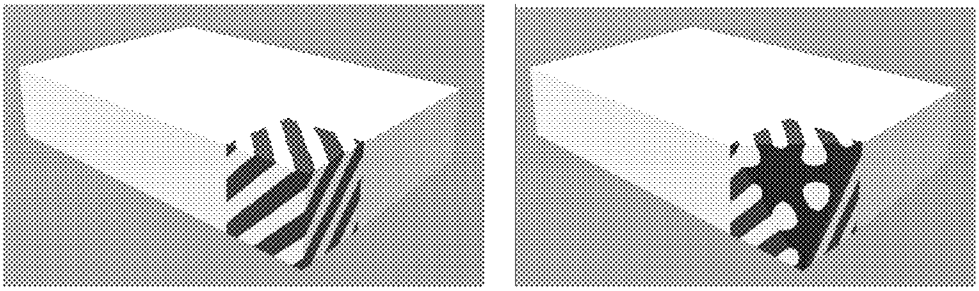
FIG. 16 represents a diamond unit cell with 30 mm length and 7 mm wall thickness in a 150×100×30 mm insert (A) and a diagonal cut representation (B).
Figure 17:
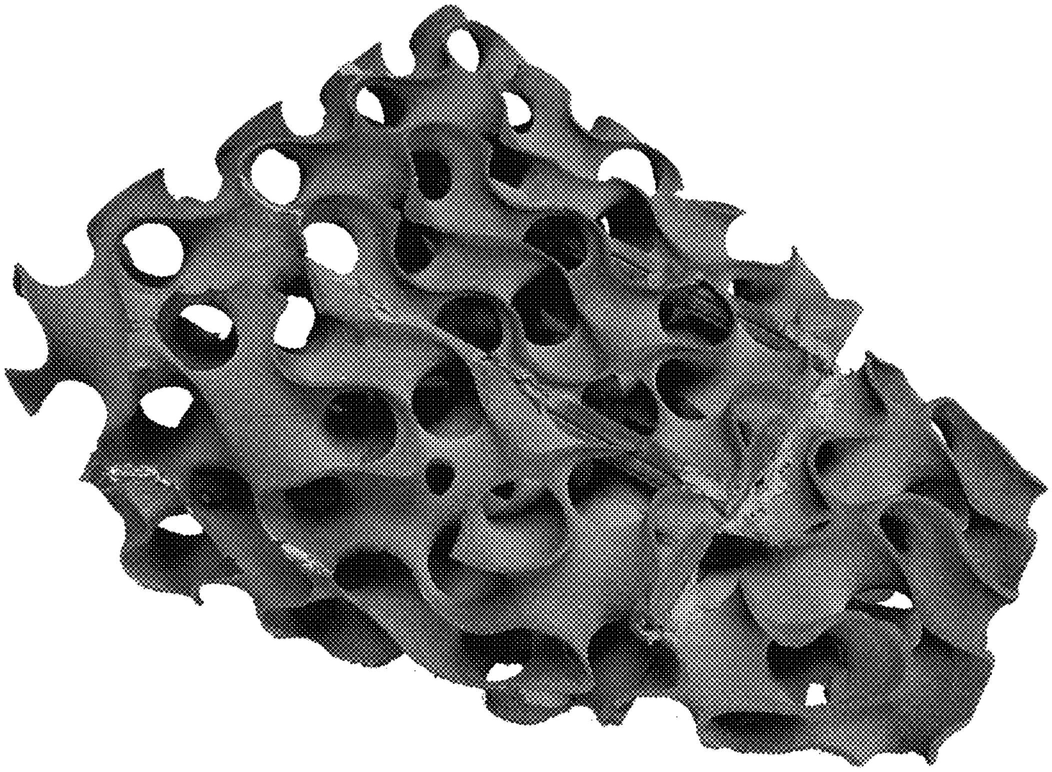
FIG. 17 is a detailed view of a 3D printed pyramidal TPMS reinforcement to be placed in a mould for the casting of a tooth.

The homogenous mixture was used to print a diamond lattice structure of 150×100×30 mm with a cell unit size of about 30 mm and a wall thickness of about 7 mm (as represented in FIG. 16) with the same equipment used for example 1. An aqueous binder based on a mix of diethylene glycol as dispersion in a water solution of 2-butoxyethanol was used to print the part (BA005 EXone).

The key parameters of the AM process were the same as for the previous examples (curing at 200° C. for 2 hours and then furnace heated at 1150° C.).

This diamond lattice structure was obtained by a powder packing density of 49% and comprises a total of about 73 vol % empty space available for a ferroalloy infiltration (about 45 vol % due to voids in the diamond lattice structure (cell unit) and an additional 28 vol % micrometric pores inside the cell walls), the remaining 27 vol % in the cell walls being titanium carbide+metallic titanium.

Figure 13:
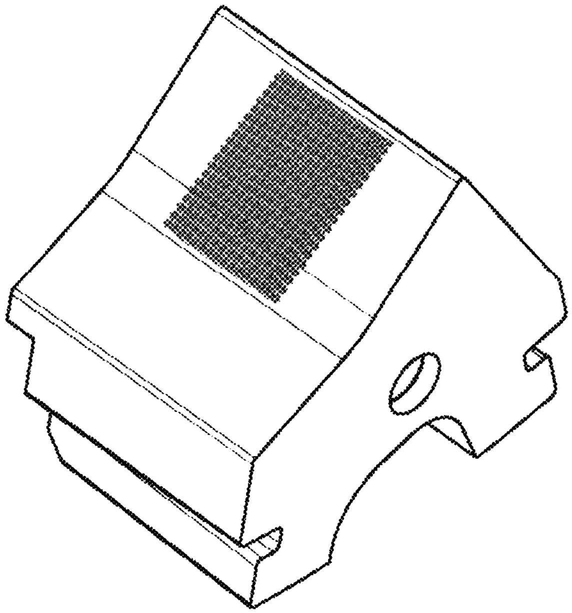
FIG. 13 represents the outline of a reinforced anvil with a grain aggregate ceramic-metal insert structure of the prior art in the same position as shown in FIG. 12.

The obtained diamond lattice structure is then positioned in a sand mold in the area of the wear part to be reinforced (hierarchical wear part as represented in FIG. 13).

Hot liquid high-chromium white iron at about 1640° C. is then poured into the mold, filling the 45 vol % of the diamond lattice voids and infiltrating the 28 vol % of micrometric porosity between the particles of the cell walls.

After pouring, 55 vol % of the reinforced volume contains a high concentration of about 49 vol % of titanium carbide (powder packing density). The global volume content of titanium carbide in the reinforced portion of the wear part is thus of about 27 vol %.

Example 4

A mixture of 90 wt % of $TiC_{0.5}No_{0.5}$ powder, with an average particle size of 7 μm, was mixed for about 15 minutes with 10 wt % of titanium powder, with an average particle size of 40 μm in a blender inerted with argon.

The homogenous mixture was used to print again a diamond lattice structure of 150×100×30 mm with a cell size of 30 mm and a thickness of 7 mm (as represented in FIG. 16) with the same equipment used for example 1.

The key parameters of the printing process were the following:

each printed layer was 100 μm thick;

the printing speed was 90 seconds per layer;

binder saturation was 100%; and powder packing density was about 50%.

After completion, the entire printing box was cured in an oven at 200° C. for 2 hours per cm of part height. After cooling, the printing box was de-powdered by vacuuming and brushed to obtain the green diamond lattice structure.

The green diamond lattice structure was placed in a furnace and heated to about 1150° C. for about 3 hours under argon atmosphere (99.5%) to allow the burnout of most of the binder.

This diamond lattice structure was obtained by a powder packing density of 50% and comprises a total of about 73 vol % empty space available for a ferroalloy infiltration (about 45 vol % due to voids in the diamond lattice structure (cell unit) and an additional 28 vol % micrometric pores inside the cell walls), the remaining 27 vol % in the cell walls being titanium carbo-nitride+metallic titanium. Hot liquid high-chromium white iron is then poured into the mold.

The hot, liquid, high-chromium white iron is thus filling about 45 vol % of the diamond lattice structure and then the 28 vol % of micrometric porosity between the particles. By reacting with the carbon from the cast iron, remaining titanium particles are converted into titanium carbide particles. After pouring, 55 vol % of the reinforced volume contains a high concentration of about 50 vol % of titanium carbide and titanium carbo-nitride. The global volume content of titanium carbo-nitride and titanium carbide particles in the reinforced portion of the wear part is thus of about 28 vol %.

Anvil wear parts used in a vertical shaft impactor were made with the TPMS reinforcement lattice structures obtained according to the example 1, 2, 3 and 4 of the present disclosure.

They were compared to wear parts made with granules according to U.S. Pat. No. 8,999,518 B2, with a global volume percentage of titanium carbide particles of about 28 vol % in the reinforced volume.

The following raw material powders were used:

titanium H. C. STARCK, Amperit 155.066, less than 200 mesh:

graphite carbon GK Kropfmuhl, UF4, >99.5%, less than 15 μm;

Fe, in the form of HSS M2 Steel, less than 25 μm.

A powder mixture of 15% graphite carbon, 63% titanium and 22% iron in the form of M2 steel by weight is mixed for 15 min in a Lindor mixer, under argon atmosphere.

The granulation is carried out with a Sahut-Conreur granulator: a strip is made by compaction of the powder to 75% of the theoretical density with a pressure of 200 MPa on the rolls. The strip is then crushed into granules. The granules are sifted so as to obtain a dimension of granules ranging between 1.4 and 4 mm.

This composition and specific relative density results give after reaction, according to table 5 of U.S. Pat. No. 8,999,518 B2, a volume rate of titanium carbide hard particles of about 50 vol % in the infiltrated granules.

TABLE 5 continued
Relationship between the compaction level, the theoretical density and the TiC percentage, obtained after reaction in the granule while taking into account the presence of iron.

| | Compaction of the granules | | | | | | | | |
|---|---|---|---|---|---|---|---|---|---|
| | 55 | 60 | 65 | 70 | 75 | 80 | 85 | 90 | 95 |
| TiC obtained after reaction (and contraction) in vol. % in the granules | 36.9 | 40.3 | 43.6 | 47.0 | 50.4 | 53.7 | 57.1 | 60.4 | 63.8 |

The granules are mixed with 6 wt % of an organic phenolic adhesive and placed into a mould (for example in silicone) of the desired shape. After adhesive setting (obtained at 100° C. for a sufficient time), the core is hardened and can be demoulded.

The core comprises 45 vol % of voids (millimetric interstices) in a 3D interconnected network of adhesived granules. According to table 6 of U.S. Pat. No. 8,999,518 B2, a bulk density of the order of 1.8 g/cm3 is obtained (45% of space between the granules plus 25% of porosity in the granules).

TABLE 6

Bulk density of the stack of (Ti + C + Fe) granules

| | | Compaction | | | | | | | | |
|---|---|---|---|---|---|---|---|---|---|---|
| | | 55 | 60 | 65 | 70 | 75 | 80 | 85 | 90 | 95 |
| Filling of the | 70 | 1.6 | 1.8 | 1.9 | 2.1 | 2.2 | 2.4 | 2.5 | 2.7 | 2.8 |
| reinforced | 65 | 1.5* | 1.7 | 1.8 | 1.9 | 2.1 | 2.2 | 2.3 | 2.5 | 2.6 |
| portion of the | 55 | 1.3 | 1.4 | 1.5 | 1.6 | 1.8 | 1.9 | 2.0 | 2.1 | 2.2 |
| part in vol. % | 45 | 1.1 | 1.1 | 1.2 | 1.3 | 1.4 | 1.5 | 1.6 | 1.7 | 1.8 |

*Bulk density (1.5) = theoretical density (4.25) × 0.65 (filling) × 0.55 (compaction)

The core is positioned in a sand mold in the area of the wear part to be reinforced (hierarchical wear part as represented in FIG. 13) which thus comprises 55% by volume of porous granules. After reaction, in the reinforced portion, 55% by volume of areas with a high concentration of about 50% of globular titanium carbide are obtained according to table 4 of U.S. Pat. No. 8,999,518 B2, i.e. about 28% by volume of the global titanium carbide in the reinforced macro-microstructure of the wear part.

TABLE 4

Global TiC percentage obtained in the reinforced macro-microstructure after reaction of Ti + 0.98 C + Fe in the reinforced portion of the wear part.

| | | Compaction of the granules (% of the theoretical density which is 4.25 g/cm$^3$) | | | | | | | | |
|---|---|---|---|---|---|---|---|---|---|---|
| | | 55 | 60 | 65 | 70 | 75 | 80 | 85 | 90 | 95 |
| Filling of the | 70 | 25.9 | 28.2 | 30.6 | 32.9 | 35.5 | 37.6 | 40.0 | 42.3 | 44.7 |
| reinforced | 65 | 24.0 | 26.2 | 28.4 | 30.6 | 32.7 | 34.9 | 37.1 | 39.3 | 41.5 |
| portion of the | 55 | 20.3 | 22.2 | 24.0 | 25.9 | 27.7 | 29.5 | 31.4 | 33.2 | 35.1 |
| part (vol. %) | 45 | 16.6 | 18.1 | 19.6 | 21.2 | 22.7 | 24.2 | 25.7 | 27.2 | 28.7 |

Performance Comparison with Prior Art Anvils

Figure 9:
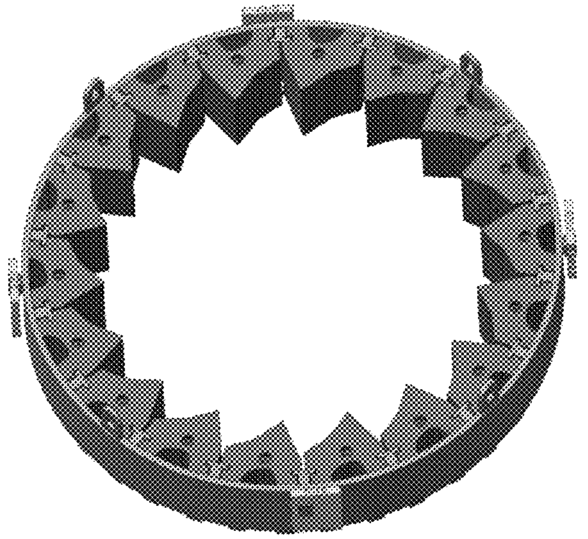
FIG. 9 represents an anvil ring of MAG'Impact 2700 milling machine in which tests were carried out on anvils prepared with TPMS-based structural reinforcements according to the present disclosure. In this machine, the applicant placed an anvil comprising a TPMS ceramic-metal reinforcement according to the present disclosure surrounded on either side by a reinforced anvil by a usual ceramic insert according to the prior art.

The anvil ring of the vertical shaft impact crusher in which these tests were carried out is illustrated in FIG. 9.

Figure 10:
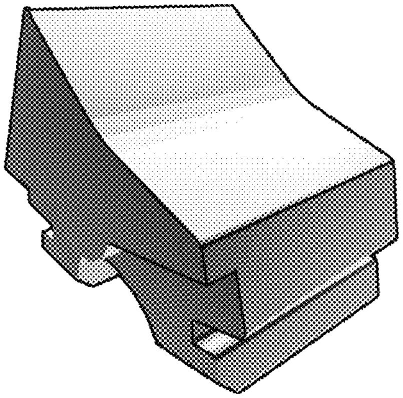
FIG. 10 represents an unworn cast anvil suitable to be reinforced according to the concept of the present disclosure.
Figure 11:
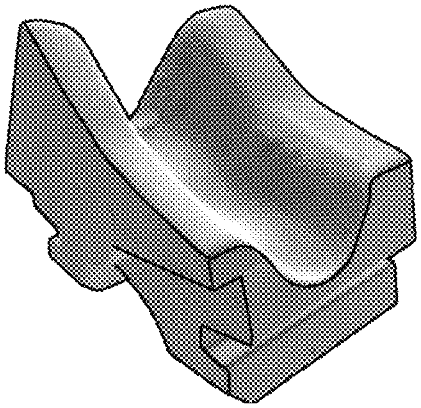
FIG. 11 represents a worn cast anvil.

In this machine (a MAG'Impact 2700), the applicant placed an anvil comprising a reinforcement according to the present disclosure surrounded on either side by a reinforced anvil according to state-of-the-art reinforcement with granules made according to U.S. Pat. No. 8,999,518 B2, to evaluate the wear behaviour under identical conditions. Material to be crushed is projected at high speed onto the working face of the anvils (an unworn individual anvil is represented in FIG. 10). During crushing, the working face is worn (a worn individual anvil is represented in FIG. 11).

For each anvil, the weight loss is measured after use.

$$\% \text{ weight loss} = \big((\text{final weight} - \text{initial weight})/\text{initial weight}\big) \times 100$$

A performance index is defined as below, the weight loss of reference being the average weight loss of parts made according to U.S. Pat. No. 8,999,518 B2, anvil on each side of the test anvil.

$$PI = \% \text{ weight loss of reference}/\% \text{ weight loss of test anvil}$$

Performance index above 1 means that the test anvil (invention) is less worn than the reference, below 1 means that the test anvil is more worn than the reference.

The key parameters of the 4 examples are represented in table A.

Without being bound by any theory, it is thought that:

- the better performance of example 2 could be explained by the very different design of the Gyroid TPMS structure compared to the prior art reference;
- the better performance of example 1 compared to example 2 could be explained by the reduced wear rate probably due to the smaller cell units and mesh configuration;
- the better performance of example 3 compared to example 2 can only be explained by the difference of the TPMS;

the better performance of example 4 compared to example 3 could be explained by the better wear resistance of titanium carbo-nitride compared to titanium carbide.

TABLE A

| Dimensions of the reinforced area = 150 × 100 × 30 mm for all examples | Example 1 FIG. 14 | Example 2 FIG. 15 | Example 3 FIG. 16 | Example 4 FIG. 16 | US 8,999,518 B2 Prior art |
|---|---|---|---|---|---|
| TPMS Geometry of the reinforcement | Gyroid TPMS | Gyroid TPMS | Diamond TPMS | Diamond TPMS | Adhesived granules 1.4 to 4 mm |
| Cell unit size (mm) | 11 | 29 | 30 | 30 | — |
| Cell wall thickness (mm) | 3 | 8 | 7 | 7 | — |
| Volume of reinforced area ($cm^3$) | 450 | 450 | 450 | 450 | 450 |
| Cell Voids of TPMS lattice or macroscopic porosity (*) of the reinforcement (%) | 47% | 46% | 45% | 45% | 45% (*) |
| Micro-porosity of the TPMS lattice material (cell walls) or grains (*) | 51% (in-situ infiltration) | 51% (in-situ infiltration) | 51% (in-situ infiltration) | 50% (in-situ infiltration) | 25% (*) (in-situ infiltration) |
| Raw material composition for insert manufacturing (wt %) | TiC: 93 Ti: 7 | TiC: 93 Ti: 7 | TiC: 93 Ti: 7 | $TiC_{0.5}N_{0.5}$: 90 Ti: 10 | Ti: 63 C: 15 Fe: 22 |
| Theoretical material density ($g/cm^3$) | 4.9 | 4.9 | 4.9 | 5.02 | 4.25 |
| Weight of reinforcement before pouring (g) | 573 | 583 | 594 | 621 | 789 |
| Type of hard particles in the reinforced portion of the wear par | Titanium carbide | Titanium carbide | Titanium carbide | Titanium carbonitride | Titanium carbide |
| Calculated weight of hard particles in reinforcement after pouring (g) | 582 | 593 | 604 | 637 | 615 |
| Volume rate of hard particles in the ferroalloy embedded TPMS lattice or grains (*) | 49% | 49% | 49% | 50% | 50% |
| Overall volume rate of hard particles in the reinforced portion of the wear part | 26% | 26% | 27% | 28% | 28% |
| Performance Index | 1.2 | 1.1 | 1.3 | 1.4 | 1 |

Tooth

Figure 7:
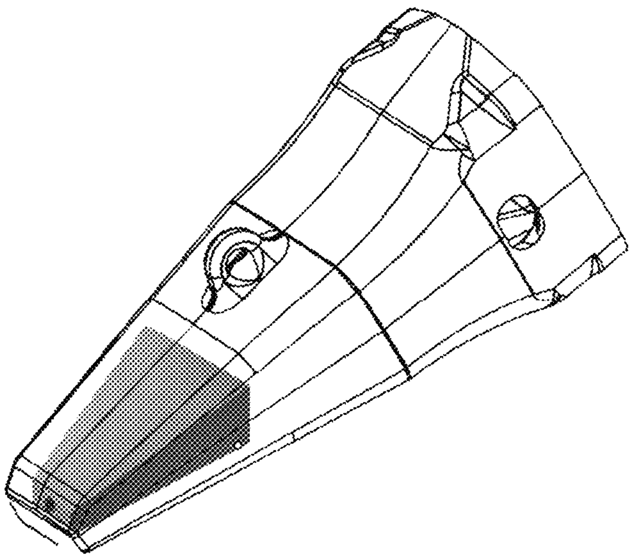
FIG. 7 represents the outline of a reinforced tooth with a typical infiltrable porous ceramic-metal insert of the prior art positioned in the most stressed zone.
Figure 8:
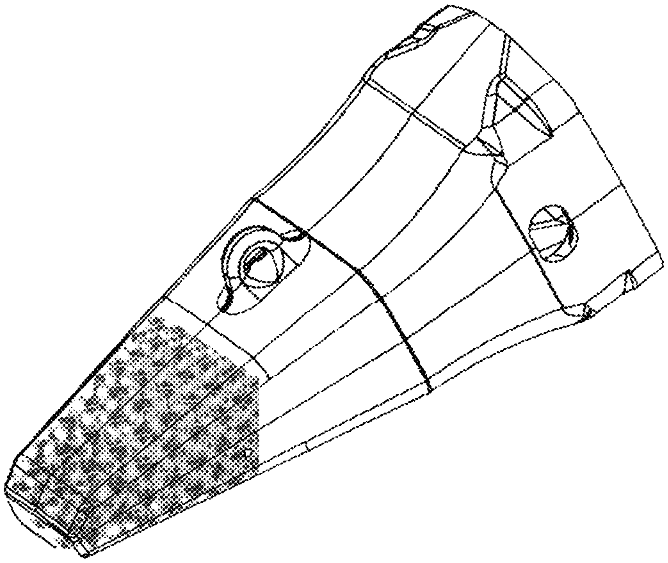
FIG. 8 represents the outline of the same tooth as in FIG. 7 with an infiltrable gyroid-based ceramic-metal lattice structure according to the present disclosure.

Ground engaging teeth used in rope shovels and bulldozer bucket have been cast in a sand mold with a reinforced part comprising a ceramic TPMS lattice structure according to the present disclosure (FIG. 8). They were compared to wear parts made with a reinforcement made with granules enclosed in a metallic container, in the shape of a truncated rectangular-based pyramid with a central cylindrical perforation made according to WO2019/211268 A1 (FIG. 7), providing a global volume percentage of titanium carbide of about 27 vol % in the reinforced area.

Mechanical properties are key parameters in ground engaging teeth applications. The TPMS-based lattice structure of this invention was designed according to the following rules:

- The vol % of the TPMS lattice structure to the cast metal ratio in the reinforced part of the tooth is gradually lowered towards the surface of the part by using a variable cell wall thickness or variable cell unit size. Contrary to the prior art WO2019/211268 A1, the reinforcement of which has to be placed preferably at least 2 to 6 mm below the surface, the present disclosure, due to controlled and variable amount of reinforcement, allows the placement of the reinforcement core directly at the wear part surface without creating critical stresses or cracks. Such possibility allows to increase the reinforced volume and, by using the same quantity of material, to decrease the overall volume rate of hard particles in the reinforced area and thus to further decrease the mechanical stresses due to the thermal expansion mismatch between the reinforcement material and the cast metal.
- The cell wall thickness increases progressively away from the surface to the inner core of the tooth, while the size of the cell unit remains substantially constant or is simply increased towards the surface of the wear part.
- To ensure the mechanical properties of the tooth above a defined depth below the external surface, the reinforcement to metal ratio is also lowered towards the centre of the tooth.
- In between, the reinforcement to metal ratio is kept higher to maximize the wear resistance.

This type of design can be easily produced with additive manufacturing, allows to also reinforce the initial surface of the tooth without creating critical stresses, and increase the bulk wear resistance while maintaining a core with high mechanical resistance. In this way, the ceramic concentration can be managed via variable cell unit size and/or variable cell wall thickness.

For gyroid lattice structures with thin cell walls enduring turbulent pouring of liquid metal, a higher strength than the one of only partially sintered cores may be needed. Dense ceramic TPMS lattice structures are obtained through complete densification during sintering (with or without the help of an additional hot isostatic pressing step) or post infiltration.

Example 5

A spray-dried granulated powder with an average particle size $D_{50}$ of 25 μm, of the composition 88 wt % tungsten carbide and 12 wt % cobalt, was used to print a gyroidal lattice structure, as represented in FIG. 18 with complementary volume, with a constant unit cell size of 25 mm (after sintering) and a variable cell wall thickness between 2 and 6 mm (after sintering) on an Innovent 3D Binder jet printer from EXone with the same binder as in the previous examples.

The key parameters of the printing process were the following:

each printed layer was 100 μm thick, the printing speed was 90 seconds per layer;

binder saturation was 60%; and powder packing was about 45%.

After completion, the entire printing box was cured in an oven at 200° C. for about 1 hour/cm of item thickness.

After cooling, the printing box was de-powdered by vacuuming and brushed to obtain the green gyroidal lattice structure.

The green gyroidal structure was placed in a furnace and heated to 1485° C. for 45 min under vacuum with 5 mbar argon atmosphere to allow the burnout of most of the binder and a partial sintering until the entire cell wall micro-porosity was closed. It was then further isostatically hot pressed at 1485° C. for 10 minutes under 1.8 MPa argon pressure to reach a relative density of 99%.

Figure 18A:
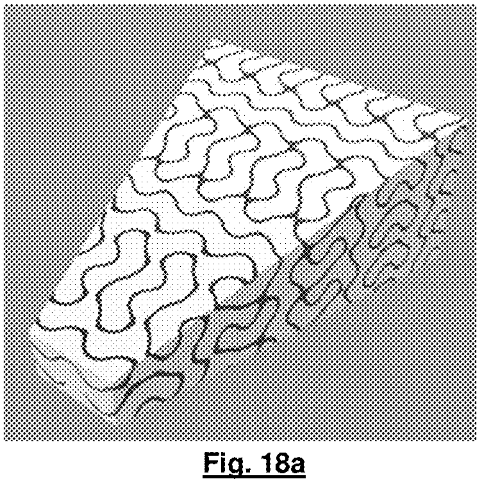
FIG. 18*a* represents a gyroid-based lattice structure with variable cell-wall thickness of the lattice structure of the examples 5 and 6 with 3 different perpendicular cut representations (18*b*, 18*c*, 18*d*) represented in combination with its complementary volume.
Figure 18B:
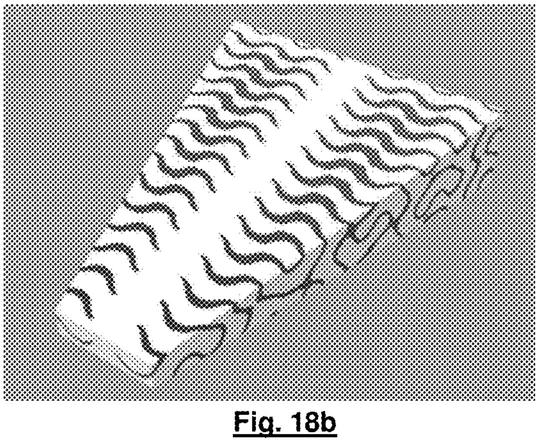
Figure 18C:
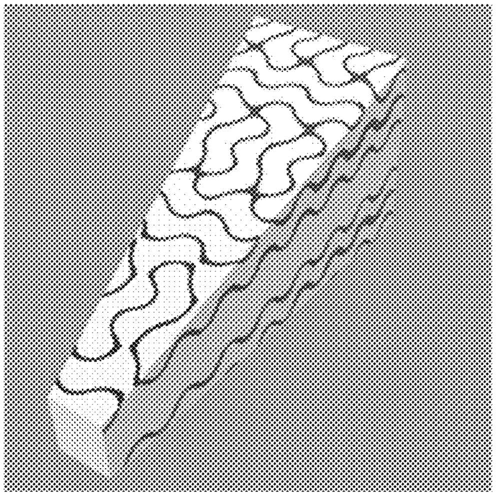
Figure 18D:
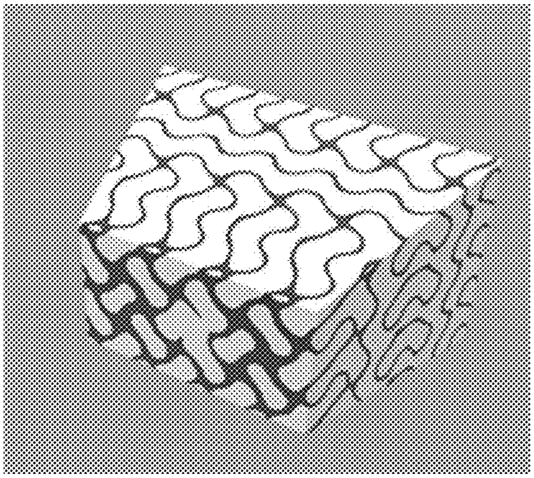

This sintered gyroidal lattice structure represented with complementary volume in FIGS. 18*b*, 18*c* and 18*d* as cross sections, comprises a total of about 74 vol % of voids and its material is dense (no significant micro-porosity in the cell walls anymore). It is positioned in a sand mold in the portion of the wear part to be reinforced (as represented in FIG. 8).

Hot liquid carbon steel is then poured at 1630° C. into the mold. The hot, liquid, carbon steel is thus filling the 74 vol % voids of the gyroid lattice structure. After pouring, about 97% (100% of the truncated pyramid minus the 3% of central cylinder hole) of the reinforced portion contains about 26 vol % of a high concentration of about 80 vol % of tungsten carbide. The global volume content of tungsten carbide in the reinforced macro-microstructure of the wear part is thus of about 21 vol %.

Example 6

A powder mixture, made of 75% by weight of titanium carbide powder, 19.5% by weight of iron powder, 4% by weight of manganese powder, 1% by weight of nickel powder and 0.5% by weight of molybdenum powder, with an average particle size of 5 μm was used to print a gyroidal lattice structure with a constant cell size of 25 mm (after sintering) and a variable thickness from 2 to 6 mm (after sintering), similar to example 5, with the following parameters:

The key parameters of the printing process were the following:

each printed layer was 50 μm thick;

the printing speed was 90 seconds per layer;

binder saturation was 100%; and powder packing was about 45%.

After completion, the entire printing box was cured in an oven at 200° C. for 2 hours per cm of part height. After cooling, the printing box was de-powdered by vacuuming and brushed to obtain the green gyroidal lattice structure.

The green gyroidal structure was placed in a furnace and heated to 1430° C. for 3 hours under vacuum with 4 mbar argon atmosphere to allow the burnout of most of the binder and a partial sintering until all cell wall micro porosity was closed. It was then further isostatically hot pressed at 1430° C. for 10 minutes under 1.8 MPa argon pressure to reach a relative density of 99%.

This sintered gyroidal lattice structure represented with complementary volume in FIGS. 18*b*, 18*c* and 18*d* as cross sections, comprises a total of about 74 vol % voids due to the gyroid lattice. It is positioned in the sand mold in the area of the wear parts to be reinforced (as represented in FIG. 8). Hot liquid carbon steel is then poured into the mold.

The hot, liquid, carbon steel is thus filling the 74 vol % of the gyroidal lattice voids. After pouring, about 97% (100% of the truncated pyramid minus the 3% of central cylinder hole) of the reinforced portion contains about 26 vol % of a high concentration of about 82 vol % of titanium carbide. The global volume content of titanium carbide in the reinforced portion of the wear part is thus of about 21 vol %.

Example 7

A powder titanium carbide with an average particle size $D_{50}$ of 11 μm was used to print a gyroidal lattice structure with a constant cell size of 20 mm and a variable cell wall thickness from 2 to 7 mm, as represented in FIG. 19 with complementary volume, with the following parameters.

The key parameters of the printing process were the following:

each printed layer was 100 μm thick;

the printing speed was 90 seconds per layer;

binder saturation was 100%; and powder packing was about 50%.

After completion, the full printing box was cured in an oven at 200° C. for 2 hours per cm of part height. After cooling, the printing box was de-powdered by vacuuming and brushed to obtain the green gyroidal lattice structure.

The green gyroidal lattice structure was placed in a furnace in a crucible containing enough 4140 steel powder (of composition Cr: 1.11 wt %, Mn: 1.04 wt %, C: 0.4 wt %, Si: 0.24 wt %, Mo: 0.23 wt %, Fe: balance) to fill the 50% volume micro-porosity of the lattice structure and then heated to 1450° C. for 10 min under 0.001 mbar vacuum to allow the complete infiltration of the porous shape by capillarity to reach a relative density of 98%.

Figure 19A:
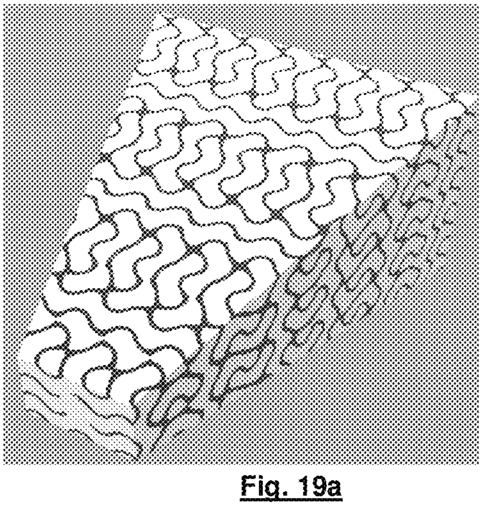
FIG. 19*a* represents a gyroid-based lattice structure with variable cell-wall thickness of the lattice structure of the example 7 and 8 with 3 with different perpendicular cut representations (19*b*, 19*c*, 19*d*).
Figure 19B:
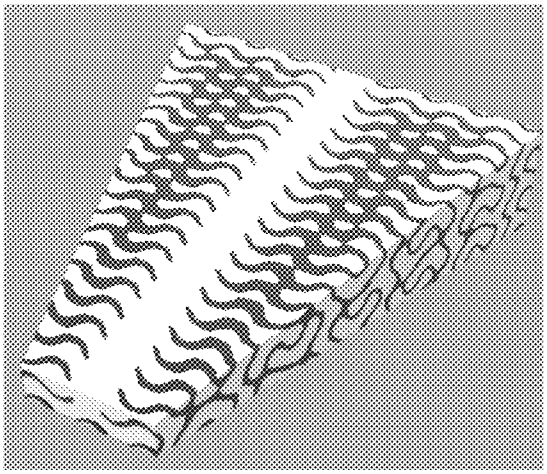
Figure 19C:
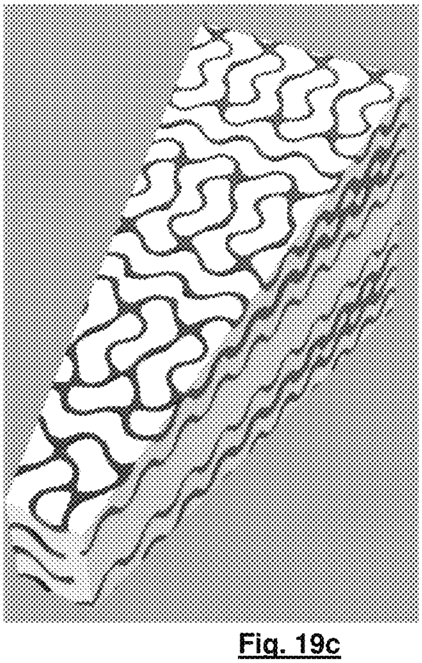
Figure 19D:
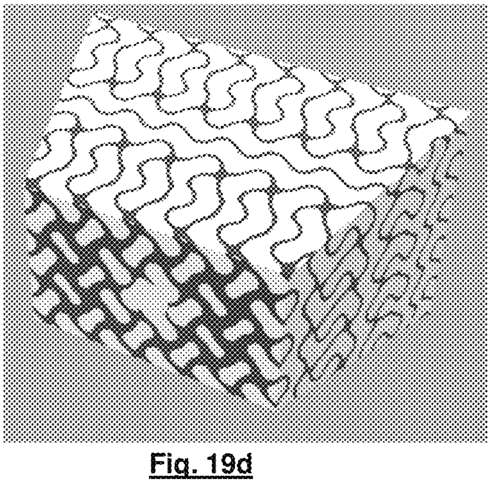
Figure 20:
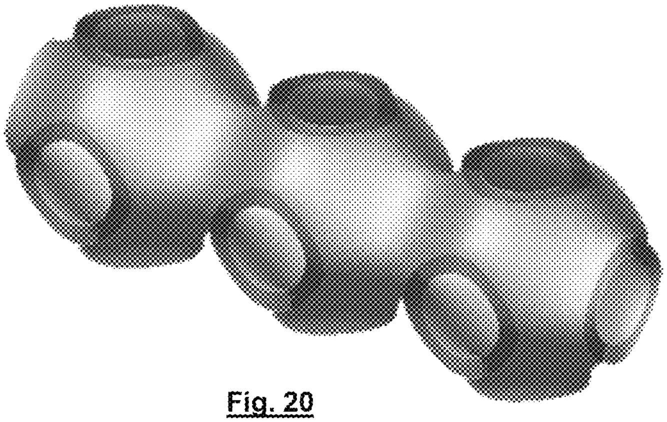
FIG. 20 illustrates the continuous curvature at the junction of the unit cells of a TPMS lattice structure
Figure 21:
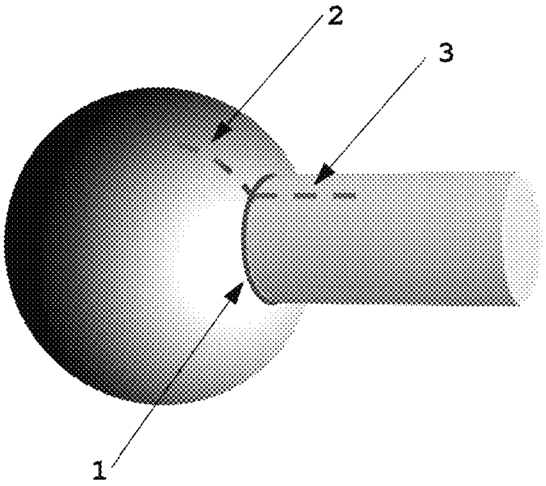
Fig. 21 PRIOR ART
FIG. 21 shows the structure disclosed in CN108396165A, which is not a TPMS lattice structure, showing a discontinuous curvature at the junction of two unit elements.

This gyroidal lattice structure, the different cross sections of which are represented with complementary volume in FIGS. 19*b*, 19*c* and 19*d*, comprises a total of about 56 vol % voids due to the gyroid lattice. It is positioned in the sand mold in the area of the wear parts to be reinforced (as represented in FIG. 8). Hot liquid carbon steel is then poured into the mold.

The hot, liquid, carbon steel is thus filling the 56 vol % of the gyroidal lattice voids. After pouring, about 97% (100% of the truncated pyramid minus the 3% of central cylinder hole) of the reinforced portion contains about 44 vol % of a high concentration of about 50 vol % of titanium carbide. The global volume content of titanium carbide in the reinforced portion of the wear part is thus of about 21 vol %.

Example 8

A mixture of 86 wt % of titanium carbide powder with an average particle size $D_{50}$ of 11 μm, was mixed for 15 minutes with 14 wt % of titanium powder, with an average particle size of 40 μm in a blender inerted with argon.

The homogenous mixture was used to print a gyroidal lattice structure with a constant cell size of 20 mm and a variable cell wall thickness from 2 to 7 mm on an X1 25 Pro 3D Binder jet printer from the company EXone. An aqueous binder based on a mix of diethylene glycol as dispersion in a water solution of 2-butoxyethanol was used to print the part. (BA005 EXone).

The key parameters of the AM process were the following:

each printed layer was about 100 μm thick;

the printing speed was 90 seconds per layer;

the binder saturation of the powder pores was 90%; and the powder packing density was about 49%.

After completion, the entire printing box was cured in an oven at about 200° C. for 2 hours per cm of part height, the residence time being dependent on the number of lattice structures since multiple items can be manufactured in one run. After cooling, the printing box was de-powdered by vacuuming and brushed to obtain the green gyroid lattice structure.

The obtained green gyroid-based lattice structure was placed in a furnace and heated to about 1150° C. for 2 hours under argon atmosphere to allow the burnout of most of the binder.

This gyroidal lattice structure was obtained by a powder packing density of 49% and comprises a total of about 78 vol % empty space available for a ferroalloy infiltration (about 56 vol % due to voids in the gyroidal lattice structure (cell unit) and an additional 22 vol % micrometric pores inside the cell walls), the remaining 22 vol % in the cell walls being titanium carbide+metallic titanium.

The obtained gyroidal lattice structure is then positioned in a sand mold in the area of the wear part to be reinforced. Hot liquid carbon steel is then poured into the mold. The hot, liquid, carbon steel is filling the 56 vol % of the gyroidal lattice voids and infiltrating the 22 vol % of micrometric porosity between the particles of the cell walls.

The different cross sections of the gyroidal lattice structure are represented with complementary volume in FIGS. 19*b*, 19*c* and 19*d*.

After pouring, about 97% (100% of the truncated pyramid minus the 3% of central cylinder hole) of the reinforced portion contains about 44 vol % of a high concentration of about 49 vol % of titanium carbide (powder packing density). The global volume content of titanium carbide in the reinforced area of the wear part is thus of about 21 vol %.

Teeth wear parts have been made according to the example 5, 6, 7 and 8 of the present disclosure as represented in FIG. 8. The teeth wear parts according to the present disclosure are compared to teeth wear parts obtained according to WO2019/211268 A1 with a global volume percentage of titanium carbide particles of about 27 vol % in the reinforced volume.

The following raw materials powder were used:

titanium H. C. STARCK, Amperit 155.066, less than 200 mesh;

graphite carbon GK Kropfmuhl, UF4, >99.5%, less than 15 μm;

Fe, in the form of HSS M2 Steel, less than 25 μm;

A powder mixture of 15% graphite carbon, 63% titanium and 22% iron in the form of M2 steel by weight is mixed for 15 min in a Lindor mixer, under argon atmosphere.

The granulation is carried out with a Sahut-Conreur granulator: a strip is made by compaction of the powder to 75% of the theoretical density with a pressure of 200 MPa on the rolls. The strip is then crushed into granules. The granules are sifted so as to obtain a dimension of granules ranging between 1.4 and 4 mm.

This composition and specific relative density results gives after reaction, according to table 2 of WO2019/211268 A1, a volume rate of titanium carbide hard particles of about 50 vol % in the infiltrated granules.

TABLE 2

Relationship between the compaction level, the theoretical density and the TiC percentage, obtained after reaction in the granule, while taking into account the presence of iron:

| | Compaction of the granules | | | | | | | | |
|---|---|---|---|---|---|---|---|---|---|
| | 55 | 60 | 65 | 70 | 75 | 80 | 85 | 90 | 95 |
| Density in g/cm$^3$ | 2.34 | 2.55 | 2.76 | 2.98 | 3.19 | 3.40 | 3.61 | 3.83 | 4.04 |
| TiC obtained after reaction (and contraction) in volume % in the granules | 36.9 | 40.3 | 43.6 | 47.0 | 50.4 | 53.7 | 57.1 | 60.4 | 63.8 |

The granules are placed in a perforated metallic container. The volume occupied by the grains is of the shape of a truncated rectangular-based pyramid (cylinder big base: 150×90 mm, small base: 50×25 mm, height: 190 mm) with a central cylinder hole perforation of 15 mm diameter.

The granules stacking comprises 45 vol % of voids (millimetric interstices) in a 3D interconnected network of granules. According to table 3 of WO2019/211268 A1, a bulk density of the order of 1.8 g/cm3 is obtained (45% of space between the granules plus 25% of porosity in the granules).

TABLE 3

| Bulk density of the stack of granules (Ti + C + Fe) | | | | | | | | | | |
|---|---|---|---|---|---|---|---|---|---|---|
| Compaction | | 55 | 60 | 65 | 70 | 75 | 80 | 85 | 90 | 95 |
| Filling of | 80 | 1.9 | 2.0 | 2.2 | 2.4 | 2.6 | 2.7 | 2.9 | 3.1 | 3.2 |
| the | 75 | 1.8 | 1.9 | 2.1 | 2.2 | 2.4 | 2.6 | 2.7 | 2.9 | 3.0 |
| reinforced | 70 | 1.6 | 1.8 | 1.9 | 2.1 | 2.2 | 2.4 | 2.5 | 2.7 | 2.8 |
| portion of | 65 | 1.5* | 1.7 | 1.8 | 1.9 | 2.1 | 2.2 | 2.3 | 2.5 | 2.6 |
| the part in | 55 | 1.3 | 1.4 | 1.5 | 1.6 | 1.8 | 1.9 | 2.0 | 2.1 | 2.2 |
| volume % | 45 | 1.1 | 1.1 | 1.2 | 1.3 | 1.4 | 1.5 | 1.6 | 1.7 | 1.8 |

*Bulk density (1.5) = theoretical density (4.25) × 0.65 (filling) × 0.55 (compaction)

The perforated metallic container containing 55% by volume of porous granules is positioned in a sand mold, 5 mm away from any of the surfaces of the tip of the tooth part, in the area of the wear part to be reinforced (hierarchical wear part as represented in FIG. 7) After reaction, 97% (100% of the truncated pyramid minus the 3% of central cylinder hole) of the reinforced portion comprising 55% by volume of areas with a high concentration of about 50% of globular titanium carbide are obtained, i.e. about 27% by volume of the global titanium carbide in the reinforced macro-microstructure of the wear part.

The inventor placed several teeth comprising gyroidal insert (as represented in FIG. 8) according to the present disclosure next to several teeth according to prior art WO2019/211268 A1 (as represented in FIG. 7) in the bucket of the rope shovel in which these tests were carried out to evaluate the wear under the exact same conditions.

Figure 5:
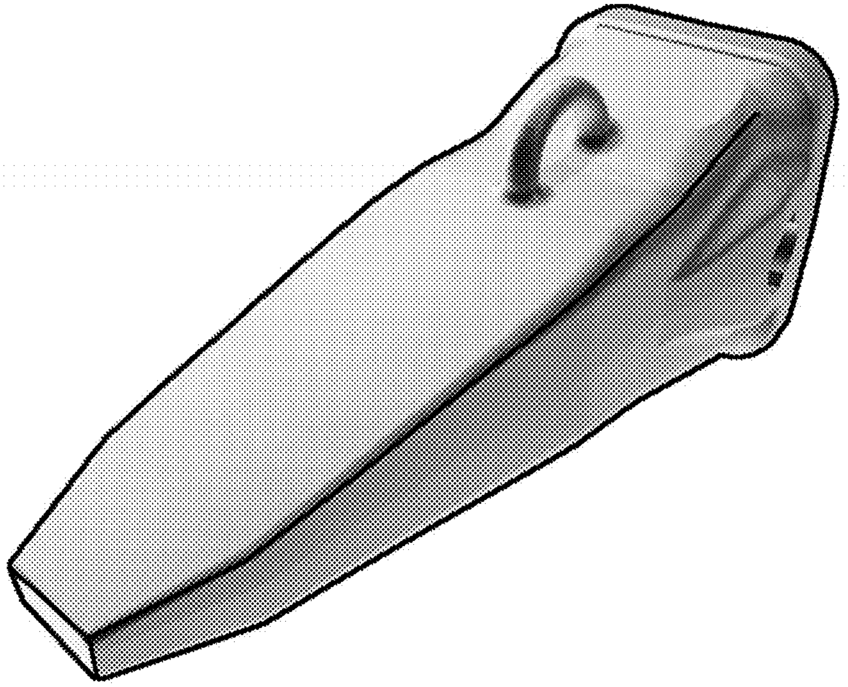
FIG. 5 represents an unworn cast tooth suitable to be reinforced according to the concept of the present disclosure.
Figure 6:
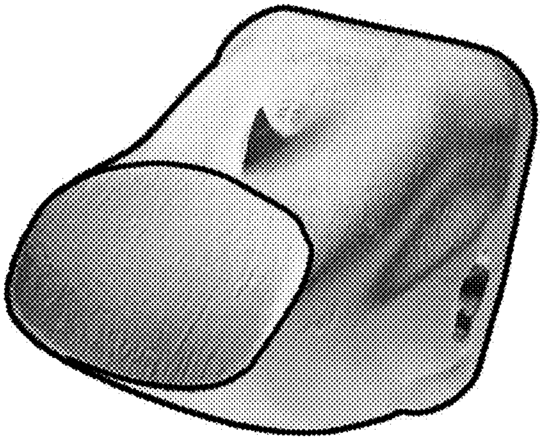
FIG. 6 represents a worn cast tooth.

The teeth of the bucket are digging the material in the pit and so are subjected to wear. A new tooth is represented in FIG. 5. A worn tooth is represented in FIG. 6.

For each example, the weight loss is measured by weighting each tooth before and after use.

$$\%\text{ weight loss} = \left((\text{final weight} - \text{initial weight})/\text{initial weight}\right) \times 100$$

A performance index is defined as below, the weight loss of reference being the average weight loss of U.S. Pat. No. 8,999,518 B2, teeth.

$$PI = \text{average \% weight loss of references/average \% weight loss of test teeth}$$

Performance index above 1 means that the test tooth is less worn than the reference, below 1 means that the test tooth is more worn than the reference.

The performance index of the above referenced examples are represented in Table B.

In this case, due to severe conditions, the bulky reinforcement material of prior art reference is damaged by chipping while the TPMS design allows a significantly better wear resistance without breakage.

Without being bound by any theory, it is thought that:

- the better performance of example 8 compared to the prior art could be explained by the very different design of the Gyroid TPMS structure and the reinforcement starting from the surface of the tooth without damaging it.
- the better performance of example 7 compared to example 8 could be explained by the better properties of the titanium carbide previously infiltrated by iron prior to casting compared to the less controlled in-situ infiltrated titanium carbide porous shape.
- the better performance of example 6 compared to example 7 could be explained by the even better properties of titanium carbide-metal composite due to the dense hot isostatically pressing step.
- the better performance of example 5 compared to example 6 could be explained by the well-known wear superiority of tungsten carbide-cobalt composite over the less dense and much cheaper titanium carbide based composite.

TABLE D

| Truncated rectangular based pyramid with 15 mm diameter central perforation | Example 5 | Example 6 | Example 7 | Example 8 | WO2019211268 A1 large base: 150 × 90, small base: 50 × 25, height: 190 |
|---|---|---|---|---|---|
| | large base: 160 × 100, small base: 60 × 35, height: 195 | | | | |
| Geometry of reinforcement | Gyroid based | Gyroid based | Gyroid based | Gyroid based | granules 1.4 to 4 mm in perforated container |
| Volume of reinforced area ($cm^3$) | 1553 | 1553 | 1553 | 1553 | 1194 |
| Volume of central hole ($cm^3$) | 34 | 34 | 34 | 34 | 34 |
| Cell unit size (mm) | 25 | 25 | 20 | 20 | — |
| Wall thickness (mm) | Variable 2 to 6 | Variable 2 to 6 | Variable 2 to 7 | Variable 2 to 7 | — |
| Cell/insert figure | 18a, 18b, 18c, 18d | 18a, 18b, 18c, 18d | 19a, 19b, 19c, 19d | 19a, 19b, 19c, 19d | |
| Cell voids of TPMS lattice or macroscopic porosity (*) of the reinforcement (%) | 74% | 74% | 56% | 56% | 45% * |
| Micro-porosity of the TPMS lattice material (cell walls) or grains (*) | 1% | 1% | 1% | 51% | 25% * (in-situ infiltration) |
| Raw material composition for insert manufacturing (wt %) | WC: 88<br>Co: 12 | TiC: 75<br>Fe: 19.5<br>Mn: 4.0<br>Ni: 1.0<br>Mo: 0.5 | TiC: 39<br>4140 steel: 61 | TiC: 86<br>Ti: 14 | Ti: 63<br>C: 15<br>Fe: 22 |

TABLE D-continued

| Truncated rectangular based pyramid with 15 mm diameter central perforation | Example 5 | Example 6 | Example 7 | Example 8 | WO2019211268 A1 large base: 150 × 90, small base: 50 × 25, height: 190 |
|---|---|---|---|---|---|
| | large base: 160 × 100, small base: 60 × 35, height: 195 | | | | |
| Theoretical material density (g/cm$^3$) | 14.3 | 5.44 | 6.38 | 4.86 | 4.25 |
| Weight of reinforcement before pouring (g) | 5657 | 2147 | 4218 | 1610 | 2034 |
| Type of ceramic particles in the reinforced portion of the wear par | Tungsten carbide | Titanium carbide | Titanium carbide | Titanium carbide | Titanium carbide |
| Calculated weight of hard particles in reinforcement after pouring (g) | 4978 | 1610 | 1645 | 1658 | 1587 |
| Volume rate of hard particles in the ferroalloy embedded TPMS lattice or grains (*) | 80% | 82% | 50% | 49% | 50% |
| Overall volume rate of hard particles in the reinforced | 21% | 21% | 21% | 21% | 27% |
| Performance Index | 1.8 | 1.4 | 1.3 | 1.2 | 1 |

The invention claimed is:

1. A method for the manufacturing of a hierarchical composite wear component, the hierarchical composite wear component comprising a reinforced part comprising a reinforcement of a triply periodic minimal surface ceramic lattice structure, selected from the group consisting of gyroid, lidinoid, neovius, P-surface, diamond (D-surface), and I-WP or their combinations and derivatives, said structure comprising multiple cell units, wherein the triple periodic minimal surface has a continuous curvature at any points of the structure, not only within cell units, but also at the junctions between two cell units, said cell units comprising voids and micro-porous ceramic cell walls, wherein micro-pores of the cell walls comprise a sintered metal or a cast metal, and wherein the ceramic lattice structure is embedded in a bi-continuous structure having a cast metal matrix, the method comprising:
   - additive manufacturing the ceramic lattice structure of a triple periodic minimal surface geometry via a powder mix comprising ceramic particles;
   - at least partially sintering the ceramic lattice structure;
   - positioning the ceramic lattice structure in a mold; and
   - casting a ferroalloy to obtain the reinforced hierarchical composite wear component.

2. The method according to claim 1, wherein at least partially sintering the reinforcement ceramic lattice structure comprises an almost complete impregnation of the micro-porosity of the cell walls of said structure by a metal selected from the group consisting of titanium, tungsten, chrome, steel, and cast iron before the positioning in the mold and the final casting.

3. The method according to claim 1, wherein at least partially sintering is followed by a hot isostatic pressing step.

4. The method according to claim 1, wherein additive manufacturing the reinforcement ceramic lattice structure based on a triple periodic minimal surface geometry comprises additive manufacturing by binder jet technology followed by a binder curing at a temperature above 150° C. or a fused bed laser technology.

5. The method according to claim 1, wherein the particles of the ceramic powder have a particle size $D_{50}$ comprised between 1 and 150 μm measured by laser diffraction technology.

6. The method according to claim 1, wherein at least partially sintering the reinforcement ceramic lattice structure comprises an almost complete impregnation of the micro-porosity of the cell walls of said structure by a metal selected from the group consisting of combinations of titanium, tungsten, chrome, steel, and/or cast iron before the positioning in the mold and the final casting.

* * * * *